United States Patent
Park et al.

(10) Patent No.: US 8,140,054 B2
(45) Date of Patent: Mar. 20, 2012

(54) METHOD FOR AUTHENTICATING SUBSCRIBER STATION, METHOD FOR CONFIGURING PROTOCOL THEREOF, AND APPARATUS THEREOF IN WIRELESS PORTABLE INTERNET SYSTEM

(75) Inventors: Ae-Soon Park, Daejeon (KR); Seok-Heon Cho, Iskan (KR); Sun-Hwa Lim, Daejeon (KR); Yeong-Jin Kim, Daejeon (KR); Jee-Hwan Ahn, Daejeon (KR)

(73) Assignees: Electronics and Telecommunications Research Institute (KR); Samsung Electronics Co., Ltd. (KR); KT Corporation (KR); SK Telecom Co., Ltd. (KR); KTFreetel Co., Ltd. (KR); Hanaro Telecom., Inc. (KR)

( * ) Notice: Subject to any disclaimer, the term of this patent is extended or adjusted under 35 U.S.C. 154(b) by 1473 days.

(21) Appl. No.: 10/578,113

(22) PCT Filed: Oct. 29, 2004

(86) PCT No.: PCT/KR2004/002766
§ 371 (c)(1),
(2), (4) Date: Jan. 8, 2007

(87) PCT Pub. No.: WO2005/043282
PCT Pub. Date: May 12, 2005

(65) Prior Publication Data
US 2007/0210894 A1    Sep. 13, 2007

(30) Foreign Application Priority Data

Oct. 31, 2003  (KR) .................. 10-2003-0076554
Aug. 27, 2004  (KR) .................. 10-2004-0067733

(51) Int. Cl.
*H04M 1/66* (2006.01)
(52) U.S. Cl. .............. 455/411; 455/410; 455/435.1; 455/550.1
(58) Field of Classification Search .............. 455/411
See application file for complete search history.

(56) References Cited

U.S. PATENT DOCUMENTS 6,219,539 B1 *  4/2001  Basu et al. .................. 455/417
(Continued)

FOREIGN PATENT DOCUMENTS

| EP | 1 343 345 A2 | 9/2003 |
|---|---|---|
| KR | 1020030008453 | 1/2003 |
| KR | 1020030040601 | 5/2003 |

(Continued)

*Primary Examiner* — Kwasi Karikari
(74) *Attorney, Agent, or Firm* — The Farrell Law Firm, P.C.

(57) ABSTRACT

Disclosed are a subscriber station authentication method, a protocol configuration method, and a device thereof in a wireless portable Internet system. In the subscriber station authentication method, an authentication mode between a subscriber station (10) and a base station (20) is negotiated, and the authentication mode is negotiated by the base station (20) according to the authentication mode negotiation. The authentication modes include an authentication mode based on the IEEE 802.16 privacy standard protocol and an authentication mode based on the standardized authentication protocol of the upper layer. Authentication is performed by the base station (10) in the case of the authentication mode based on the IEEE 802.16 privacy standard protocol, and the authentication is performed through message transmission using a diameter protocol between a base station (10) and an authentication server (40) in the case of the authentication mode based on the standardized authentication protocol of the upper layer.

23 Claims, 14 Drawing Sheets

U.S. PATENT DOCUMENTS

| | | |
|---|---|---|
| 6,804,506 B1 | 10/2004 | Freitag et al. |
| 7,257,636 B2 | 8/2007 | Lee et al. |
| 7,272,381 B2 * | 9/2007 | Aura .............................. 455/410 |
| 2003/0099213 A1 * | 5/2003 | Lee et al. ...................... 370/328 |
| 2003/0163733 A1 * | 8/2003 | Barriga-Caceres et al. .. 713/201 |

FOREIGN PATENT DOCUMENTS

| | | |
|---|---|---|
| KR | 1020030053280 | 6/2003 |
| KR | 1020050109685 | 11/2005 |
| WO | WO 99/48318 | 9/1999 |
| WO | WO 00/01187 | 1/2000 |

* cited by examiner

FIG.6

| Syntax | Size | Notes |
|---|---|---|
| SBC-REQ_Message_Format() { | | |
| Management Message Type = 26 | 8 bits | |
| TLV Encoded Information { | Variable | TLV specific |
| Bandwidth Allocation Support | 8 bits | Define by bitmap format |
| Authorization Policy Support | 8 bits | Define by bitmap format |
| Physical Parameters Supported { | | |
| Demodulator | 8 bits | Bit#0 = 64-QAM Support |
| Modulator | 8 bits | Bit#0 = 64-QAM Support |
| FFT Size | 8 bits | Bit#1 = FFT-2048 |
| } | | |
| } | | |
| } | | |

FIG.8

| Code | PKM Message Type | MAC Message Type |
|---|---|---|
| 0~2 | Reserved | |
| 3 | SA Add | PKM-RSP |
| 4 | Auth Request | PKM-REQ |
| 5 | Auth Reply | PKM-RSP |
| 6 | Auth Reject | PKM-RSP |
| 7 | Key Request | PKM-REQ |
| 8 | Key Reply | PKM-RSP |
| 9 | Key Reject | PKM-RSP |
| 10 | Auth Invalid | PKM-RSP |
| 11 | TEK Invalid | PKM-RSP |
| 12 | Auth Info | PKM-REQ |
| 13 | EAP-transfer Request | PKM-REQ |
| 14 | EAP-transfer Reply | PKM-RSP |
| 15~255 | reserved | |

FIG.9

EAP transfer Request attributes

| Attributes | Contents |
|---|---|
| Security-Capabilities | Describes requesting SS's security capabilities |
| SAID | SecurityAssociation ID, being equal to the Basic CID |
| EAP Payload | Contains the EAP-TLS Data, not interpreted in the MAC |

EAP transfer Reply attributes

| Attributes | Contents |
|---|---|
| EAP Result Code | Describes success or failure |
| Authoriazation Action Code | Describes SS's policy, re-authorization or re-initialization |
| Key Sequence Number | Authorization Key sequence number |
| Key Life Time | Authorization Key life time |
| SA Descriptor | Specifies an SAID and additional properties of the SA |
| EAP Payload | Contains the EAP-TLS Data, not interpreted in the MAC |

FIG.10

| Type | Length | Value | Scope |
|---|---|---|---|
| 5.21 | 1 | bit #0 : 802.16 Privacy - 701<br>bit # 1 : Open Privacy - 702<br>bit #2-7 : reserved; shall be set to zero - 703<br>(bit #2 : EAP-TLS, bit #3 : EAP-TTLS) - 704 | SBC-REQ<br>(see 1.1.1.1.1)<br>SBC-RSP<br>(see 1.1.1.1.2) |

METHOD FOR AUTHENTICATING SUBSCRIBER STATION, METHOD FOR CONFIGURING PROTOCOL THEREOF, AND APPARATUS THEREOF IN WIRELESS PORTABLE INTERNET SYSTEM

TECHNICAL FIELD

The present invention relates to a method for authenticating a subscriber station in a wireless portable Internet system. More specifically, the present invention relates to a method for authenticating a subscriber station, a method for configuring a protocol thereof, and an apparatus thereof in a wireless portable Internet system for accepting a standardized protocol of an upper layer for authenticating a mobile subscriber and a subscriber in interworking.

BACKGROUND ART

The wireless portable Internet is a next generation communication system for further supporting mobility in addition to a short range data communication system which uses fixed access points APs such as the conventional wireless local area network (LAN). Various standards have been proposed for the wireless portable Internet, and the international standardization on the portable Internet is in progress with reference to the IEEE 802.16.

The authentication and authorization standard defined by the IEEE 802.16 establishes authentication functions for stations in the wide area network configured with wireless networks. In particular, since the subscriber station (SS) authentication function standardized by a privacy layer of the IEEE 802.16 is defined only for SSs within a fixed network, it is inappropriate for the authentication function to apply SSs or subscribers to be capable of supporting mobility, which is a current trend of mobile services. That is, since the authentication function does not specify detailed functions in a base station (BS) which describes messages and procedures for authenticating the subscriber stations on the basis of the fixed networks, additional functions of the base station are required for the motile services. The requirement of additional functions requires the base station to have profiles of all subscribers who currently receive services, and the same requires a function of API for the CA interface or a function of accepting authentication clients for interface with an authentication server when the base station does not have the profiles.

Also, since the conventional authentication for the subscriber stations on the fixed network is based on digital certificates, the conventional authentication process is restricted to servers which perform certificate-based authentication when a user accesses an authentication server to be authenticated, and the conventional authentication process needs other improved functions for security of the base station since the conventional standard defines that the base station distributes a security key between the subscriber station and the base station.

DISCLOSURE OF INVENTION

Technical Problem

It is an advantage of the present invention to provide a subscriber station authentication method, a protocol configuration method, and a device thereof in a wireless portable Internet system for allowing authentication which accepts an upper layer protocol standardized for a mobile subscriber station or a subscriber station attempting to interwork with different networks in the case of authenticating the subscriber station.

Technical Solution

In one aspect of the present invention, a method for requesting authentication from a subscriber station in a wireless portable network system, comprises: (a) transmitting a basic capability negotiation message (SBC-REQ) from a subscriber station to the base station in order to establish an authentication mode; (b) receiving a reply message (SBC-RSP) on the basic capability negotiation message provided by the base station, and establishing the authentication mode; and (c) transmitting a subscriber authentication request message which corresponds to the established authentication mode, and requesting authentication on the subscriber station.

The basic capability negotiation message includes a parameter with an available authentication mode in (a).

The authentication mode is one of an authentication mode based on the IEEE 802.16 privacy standard protocol and an authentication mode based on the standardized authentication protocol of an upper layer in (b).

An authentication request message for requesting subscriber or user authentication by an authentication, authorization, and accounting (AAA) server which is connected to the base station and authenticates the subscriber is transmitted to the AAA server which is connected to the base station and authenticates the subscriber through the base station in (c) when the authentication mode is established to be an authentication mode based on the standardized authentication protocol of the upper layer in (b).

In another aspect of the present invention, a method for authenticating a subscriber station connected to a base station in a wireless portable network system, comprises: (a) transmitting to the subscriber station a reply message to which an authentication mode is negotiated according to a basic capability negotiation message for establishing an authentication mode provided by the subscriber station; (b) receiving a message for requesting subscriber authentication from the subscriber station and performing the authentication, or requesting subscriber authentication from an authentication, authorization, and accounting (AAA) server which is connected to the base station and authenticates the subscriber station; and (c) transmitting a reply message for showing authentication results to the subscriber station.

In still another aspect of the present invention, a method for configuring a subscriber station authentication protocol between a subscriber station and a base station in a wireless portable network system, comprises: (a) transmitting and receiving a basic capability negotiation message for establishing an authentication mode between the subscriber station and the base station by using an MAC message; and (b) transmitting and receiving a subscriber authentication message according to the authentication mode established in (a) between the subscriber station and the base station by using the MAC message.

The basic capability negotiation message is transmitted by using SBC-REQ and SBC-RSP messages with parameters which allow establishment of authentication modes.

The subscriber authentication message is transmitted by using PKM-REQ and PKM-RSP messages which are MAC messages of the IEEE 802.16 standard protocol or by using PKM-REQ and PKM-RSP messages to which a message for performing authentication according to the standardized protocol of the upper layer is added in (b).

In still yet another aspect of the present invention, a subscriber station for requesting authentication from a base station in a wireless portable network system, comprises: a station controller for requesting authentication mode establishment used to decide the authorization policy, and requesting authentication on the subscriber station according to the authentication mode negotiated with the base station; a digital signal transmitter and receiver for modulating, demodulating, and channel-encoding signals input and output to/from the station controller; and an analog signal transmitter and receiver for relaying transmission of analog radio signals between the digital signal transmitter and receiver and the base station.

In still further another aspect of the present invention, a base station for authenticating a subscriber station in a wireless portable network system, comprises: a base station controller for establishing an authentication mode according to an authentication request provided by the subscriber station, and performing authentication according to the negotiated authentication mode; a digital signal transmitter and receiver for modulating, demodulating, and channel-encoding signals input and output to/from the base station controller; and an analog signal transmitter and receiver for relaying transmission of analog radio signals between the digital signal transmitter and receiver and the subscriber station.

BRIEF DESCRIPTION OF THE DRAWINGS

The accompanying drawings, which are incorporated in and constitute a part of the specification, illustrate an embodiment of the invention, and, together with the description, serve to explain the principles of the invention;

FIG. 6 shows a format of a basic capability negotiation request message (SBC-REQ) used for the basic capability negotiation process shown in FIG. 5;

FIG. 8 shows PKM message types in the MAC messages used for the subscriber station authentication method in the wireless portable Internet system according to the exemplary embodiment of the present invention;

FIG. 9 shows components of messages for EAP-based subscriber authentication in the PKM messages shown in FIG. 8;

FIG. 10 shows attributes of authorization policy support parameters from parameters of the basic capability negotiation request and response message (SBC-REQ and SBC-RSP) shown in FIG. 6;

BEST MODE FOR CARRYING OUT THE INVENTION

Figure 1:
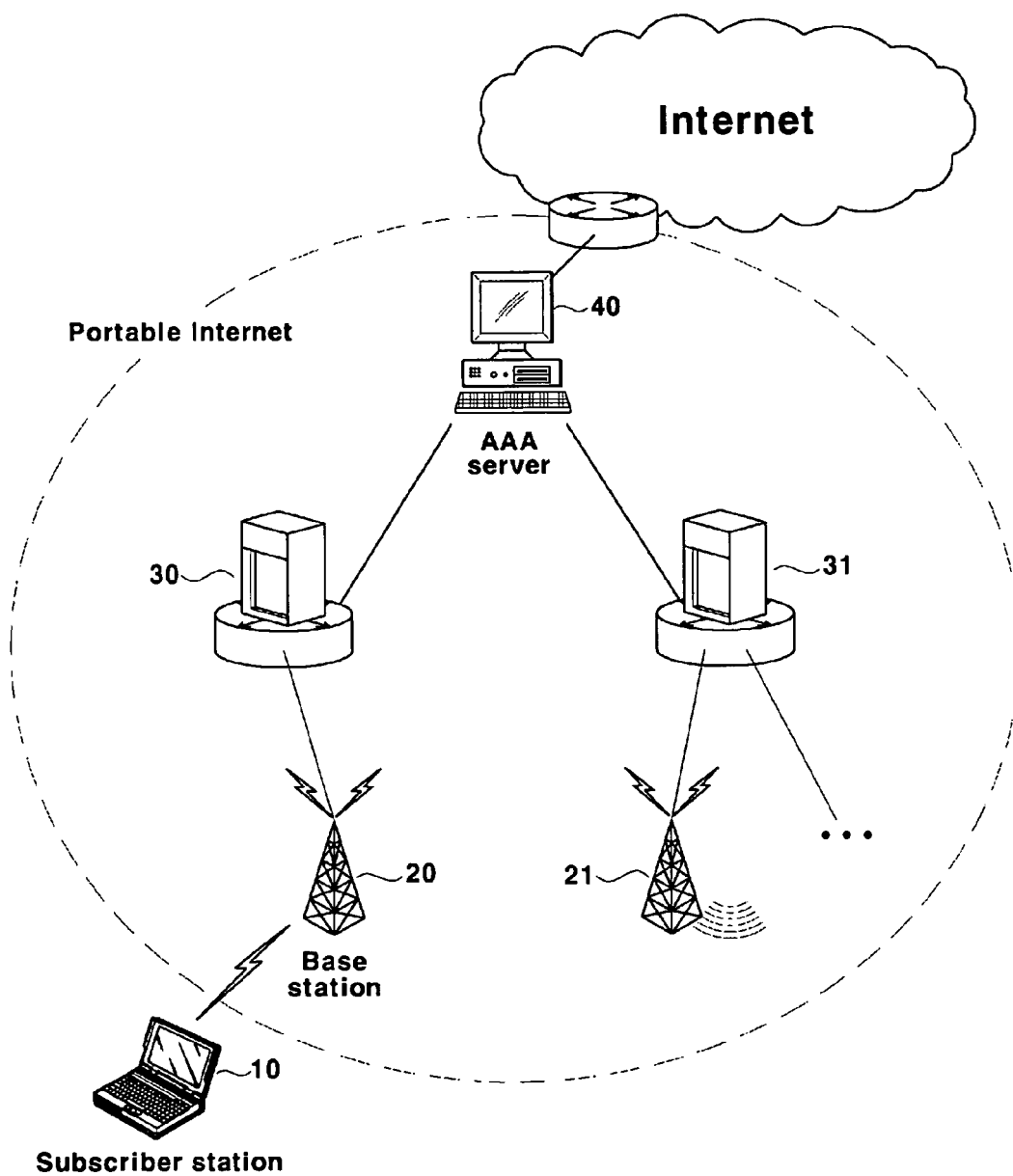
FIG. 1 shows a brief diagram of a wireless portable Internet according to an exemplary embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which sane descriptions are provided have the same reference numerals.

A subscriber station authentication method in a wireless portable Internet system according to an exemplary embodiment of the present invention will be described in detail with reference to drawings.

FIG. 1 shows a brief diagram of a wireless portable Internet according to an exemplary embodiment of the present invention.

As shown, the wireless portable Internet system comprises a subscriber station (SS) 10, base stations (BSs) 20 and 21 for performing radio communication with the subscriber station 10, routers 30 and 31 connected to the base stations 20 and 21 through a gateway, and an authentication, authorization, and accounting (AAA) server 40 being connected to the routers 30 and 31 and authenticating the base stations 20 and 21.

The wireless LAN method such as the conventional IEEE 802.11 provides a data communication method which allows short-range radio communication with reference to fixed access points, which provides no mobility of the subscriber station but which supports wireless short-range data communication other than wired short-range data communication.

The wireless portable Internet system progressed by the IEEE 802.16 group guarantees mobility and provides seamless data communication services when the subscriber station 10 shown in FIG. 1 moves to a cell covered by the base station 21 from a cell covered by the base station 20.

The above-described IEEE 802.16 supports the metropolitan area network (MAN) representing an information communication network covering the LAN and the WAN.

Therefore, the wireless portable Internet system supports handovers of the subscriber station 10, and allocates dynamic IP addresses according to movements of the subscriber station in a like manner of the mobile communication services.

The wireless portable Internet subscriber station 10 and each of the base stations 20 and 21 communicates with each other through the orthogonal frequency division multiple access (OFDMA) method which is a multiplexing method having combined the frequency division method for using a plurality of orthogonal frequency subcarriers as a plurality of subchannels with the time-division multiplexing (TDM) method. The OFDMA method is resistant against fading generated by multipaths and has high data rates.

A subscriber station 10 and a base station 20 start communication, negotiate an authentication mode for authenticating the subscriber station 10, and perform an authentication process of a selected method according to negotiation results of the authentication mode. That is, the subscriber station 10 and the base station 20 select one of a digital certificate based authentication mode of the IEEE 802.16 legacy privacy and an authentication mode based on a standardized authentication protocol of an upper layer through the SS basic capabilities negotiation procedure, and perform an authentication process on the subscriber station 10 according to the selected authentication mode.

In this instance, the standardized authentication protocol of an upper layer includes the extensible authentication protocol-transport layer security (EAP-TLS) and the EAP-tunneled TLS (EAP-TTLS), which are EAP frameworks.

When the authentication mode based on the standardized authentication protocol of the upper layer is selected according to the authentication mode negotiation between the subscriber station 10 and the base station 20, the subscriber station 10 and the base station 20 perform a preparatory process for executing the standardized authentication protocol based authentication process of an upper layer, the subscriber station 10 generates an authentication message and transmits it to the base station 20, and the base station 20 authenticates the subscriber station 10 in cooperation with the AAA server 40 which is a corresponding authentication server.

Figure 2:
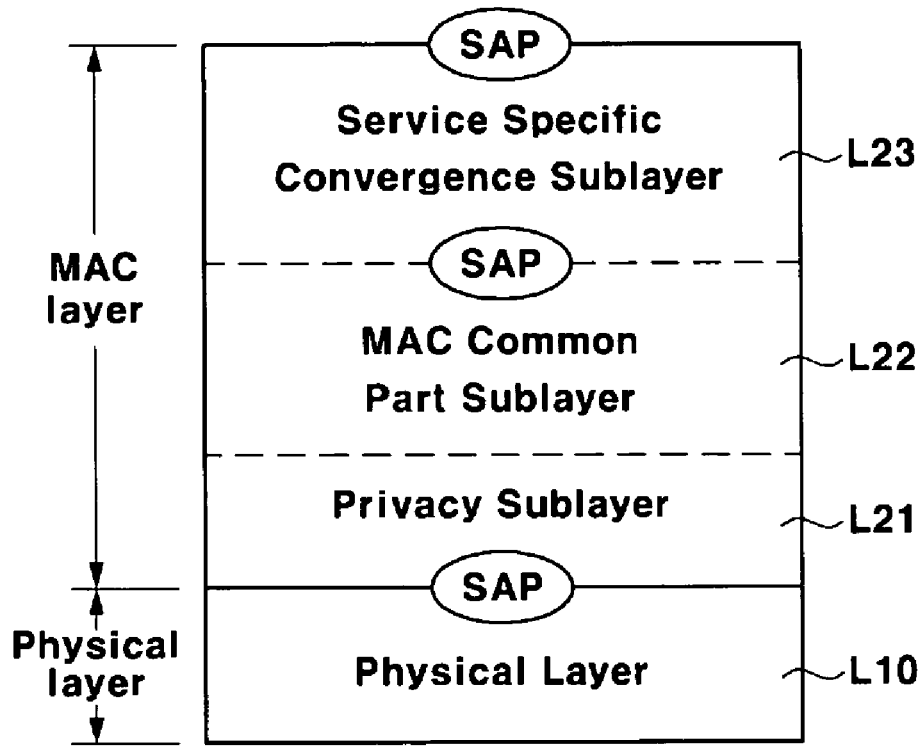
FIG. 2 shows a diagram for a layered protocol structure of the wireless portable Internet system shown in FIG. 1.

FIG. 2 shows a diagram for a layered protocol structure of the wireless portable Internet system shown in FIG. 1.

As shown, the layered protocol structure of the wireless portable Internet system of the IEEE 802.16 includes a physical layer L10 and media access control (MAC) layers L21, L22, and L23.

The physical layer L10 performs radio communication functions performed in the general physical layers, including modulation, demodulation, and coding.

The wireless portable Internet system has no layers classified for functions in a like manner of wired Internet systems, but allows a single MAC layer to perform various functions.

As to sublayers per function, the MAC layer includes a privacy sublayer L21, an MAC common part sublayer L22, and a service specific convergence sublayer L23.

The privacy sublayer L21 authenticates devices, exchanges security keys, and encodes them. The devices are authenticated by the privacy sublayer L21, and the user is authenticated in the upper layer (not illustrated) of the MAC.

The MAC cannon part sublayer L22 which is the core of the MAC layer performs a system access function, a bandwidth allocation function, a traffic connection establishing and maintenance function, and a quality of service (QoS) management function.

The service specific convergence sublayer L23 performs a payload header suppression function and a QoS mapping function in the seamless data communication.

Figure 3:
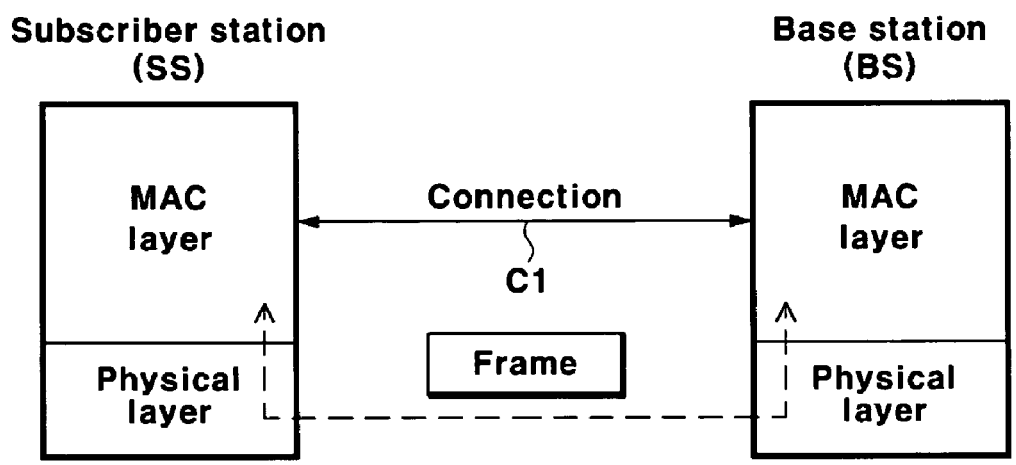
FIG. 3 shows a block diagram for a coupled structure between base stations and a subscriber station in the wireless portable Internet system shown in FIG. 1.

FIG. 3 shows a block diagram for a traffic structure between the base station 20 and the subscriber station 10 in the wireless portable Internet system shown in FIG. 1.

As shown, the MAC layer of the subscriber station 10 is connected to the MAC layer of the base station 20 through a traffic connection C1.

In this instance, the term of traffic connection C1 does not represent a physical connection relation but indicates a logical connection relation, and it is defined to be a mapped relation between the subscriber station 10 and MAC peers of the base station 20 in order to transmit traffic through a service flow.

Therefore, parameters or messages defined in the traffic connection C1 state define functions between the MAC peer layers, and actually, the parameters or the messages are processed into frames and transmitted through the physical layer, and the frames are analyzed so that the functions corresponding to the parameters or the messages are performed in the MAC layer.

In addition, the MAC messages include various messages for performing requests (REQ), responses (RSP), and acknowledgments (ACK) for various operations.

Figure 4:
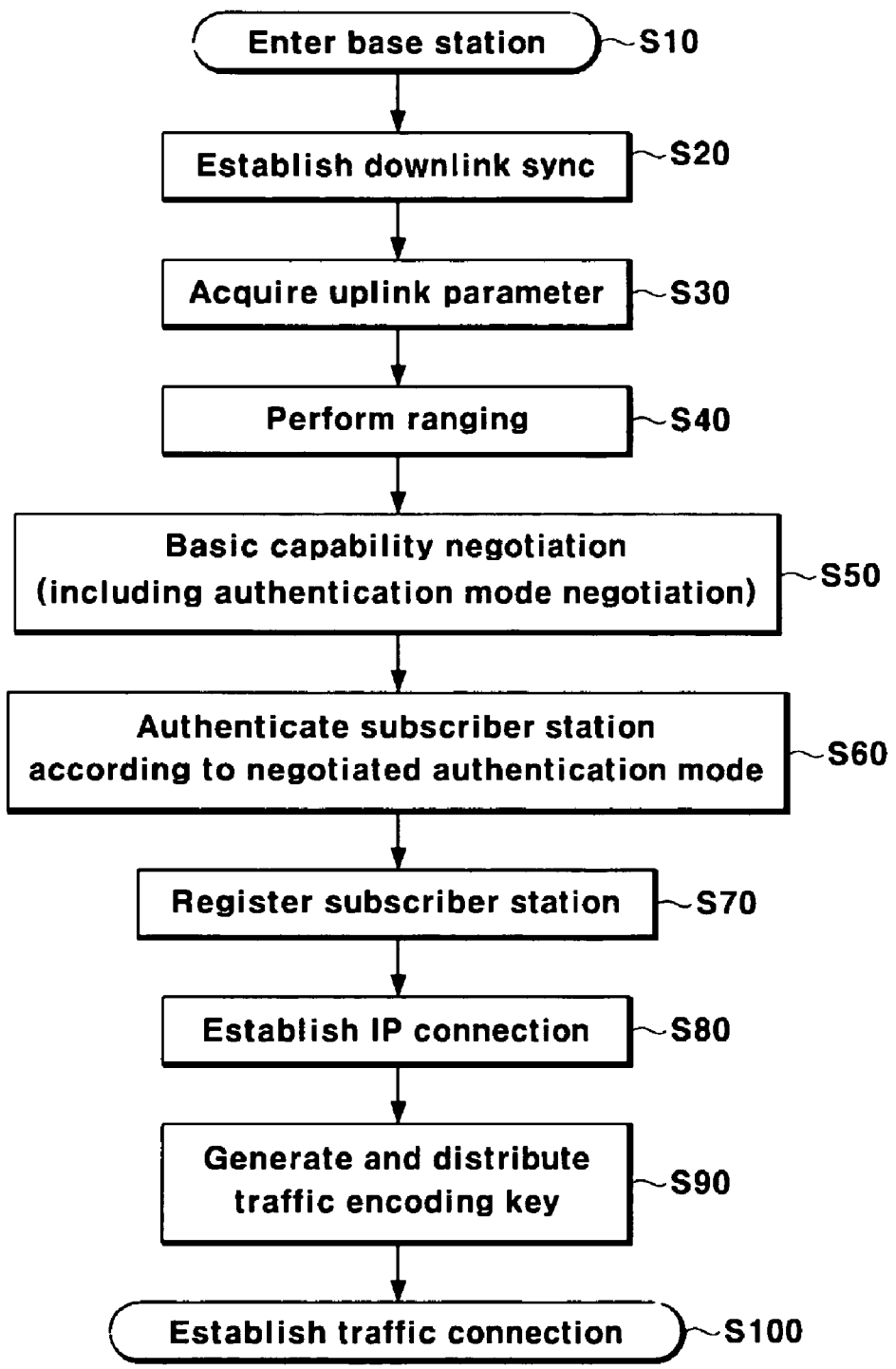
FIG. 4 shows a flowchart for establishing a traffic connection in the wireless portable Internet system according to an exemplary embodiment of the present invention.

FIG. 4 shows a flowchart for establishing a traffic connection in the wireless portable Internet system according to an exemplary embodiment of the present invention.

Referring to FIG. 4, when a subscriber station 10 enters an area of a base station 20 in step S10, the base station 20 establishes downlink synchronization with the subscriber station 10 in step S20.

When the subscriber station 10 is synchronized to the downlink from the base station 20, the subscriber station 10 acquires an uplink parameter in step S30. For example, the parameter includes a channel descriptor message which follows a characteristic of the physical layer (e.g., the signal to noise ratio (SNR)).

The subscriber station 10 and the base station 20 perform a ranging process in step S40 to perform initial ranging in the earlier stage and perform periodic ranging periodically (the ranging process corrects timing, power, and frequency information between the subscriber station 10 and the base station 20).

When the ranging process is finished, a negotiation for the SS's basic capabilities between the subscriber station 10 and the base station 20 is performed in step S50. In this step of S50, the subscriber station 10 and the base station 20 can select one of the digital certificate based authentication mode of the IEEE 802.16 legacy privacy and the authentication mode based on the standardized authentication protocols of the upper layer including the EAP-TLS and the EAP-TTLS through the negotiation.

When the negotiation of the various basic capabilities including the authentication mode is finished, the base station 20 authenticates the subscriber station 10 in step S60 according to the authentication mode selected in the previous step S50.

When the authentication for the subscriber station 10 is finished and an access authority on the wireless portable Internet is checked, the base station 20 negotiates MAC functions of the subscriber station and registers them in step S70, and the base station 20 provides an IP address to the subscriber station 20 through a DHCP server or an MIP server, and establishes IP connection in step S80.

In order to provide a traffic service to the subscriber station which has received the IP address, the base station 20 performs a process for generating and distributing a traffic encryption key in step S90, and performs traffic connection establishment in step S100.

Figure 5:
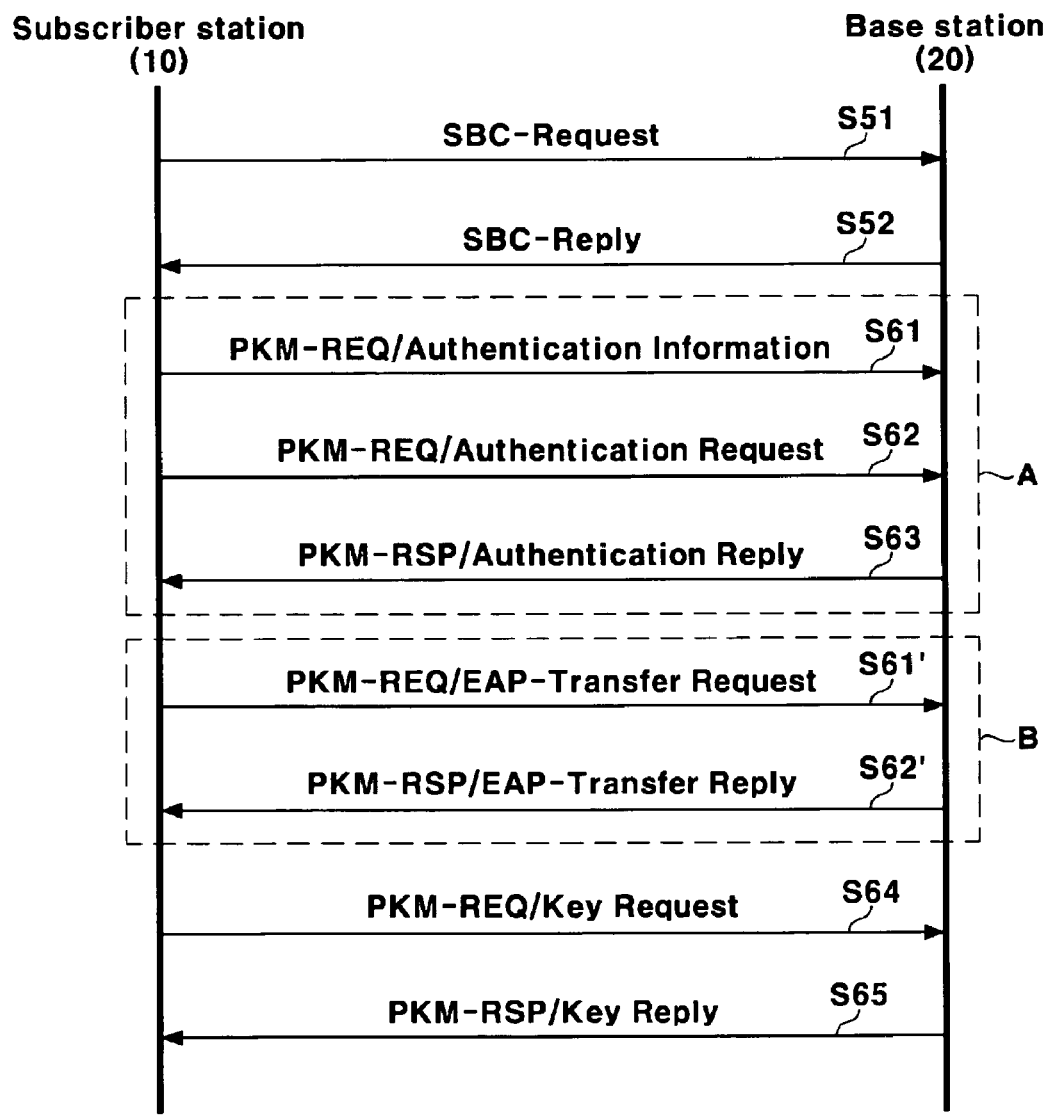
FIG. 5 shows a flowchart of a basic capability negotiation process and a subscriber station authentication process between a subscriber station and a base station shown in FIG. 4.

FIG. 5 shows a flowchart of a basic capability negotiation process and a subscriber station authentication process between a subscriber station 10 and a base station 20 shown in FIG. 4.

Referring to FIG. 5, when the ranging process between the subscriber station 10 and the base station 20 in the previous steps of S10 to S40 is finished, a subscriber station basic capability negotiation (SBC) process including an authentication mode negotiation process to select the authentication mode between the subscriber station 10 and the base station 20 is performed in step S50.

The subscriber station 10 transmits an SBC-REQ message to the base station 20 in step S51 for the purpose of a basic capability negotiation, in particular, a negotiation for selecting an authentication mode. In this instance, the basic capability negotiation message includes authentication mode parameters for supporting selection of authentication modes, which will be described later.

When receiving the SBC-REQ message from the subscriber station 10, the base station 20 performs the basic capability negotiation predefined by the IEEE 802.16 privacy standard, checks an available authentication mode through the authentication mode negotiation parameters included in the basic capability negotiation message, and selects one of the authentication modes for authenticating the subscriber station 10 in a subsequent stage. For example, the base station 20 selects one of the authentication mode of the IEEE 802.16 legacy privacy and the authentication mode following the EAP-TLS or the EAP-TTLS which is the standardized authentication protocol of the upper layer.

The base station 20 transmits basic capability negotiation results including the authentication mode to the subscriber station 10 through an SBC-RSP message in step S52, and the subscriber station 10 performs the authentication process according to the authentication mode selected by the negotiation with the base station 20. The basic capability negotiation process in the previous step S50 between the subscriber station 10 and the base station 20 is finished when the base station 20 transmits the basic capability negotiation message to the subscriber station 10.

The subscriber station 10 and the base station 20 authenticate the subscriber station 10 according to the authentication mode selected in the previous step S50.

When the digital certificate based authentication mode of the IEEE 802.16 legacy privacy is selected in the basic capability negotiation process of S50, the subscriber station 10 and the base station 20 performs the subscriber authentication process shown by a dotted block of A in FIG. 5. The subscriber authentication process includes a privacy key management request (PKM-REQ)/Authentication Information message transmission step of S61 for the subscriber station 10 to transmit a certificate of a manufacturer CA that issued an SS certificate (a CA certificate) to the base station 20 through a privacy key management (PKM) message which is one of MAC messages, a PKM-REQ/Authorization Request message transmission step of S62 from the subscriber station 10 to transmit subscriber authentication information to the base station 20 through the PKM message, and a PKM-RSP/Authentication Reply message transmission step of S63 from the base station to transmit the authentication results to the subscriber station 10 through the PKM message, which will not be further described hereinafter since this subscriber station authentication process is specified by the IEEE 802.16 legacy privacy and is well known to a person skilled in the art.

In addition, when the authentication mode following the EAP-TLS or the EAP-TTLS which is the standardized authentication protocol of the upper layer is selected in the SS basic capability negotiation process in the previous step S50, the subscriber station 10 and the base station 20 perform a subscriber authentication process given by the dotted block of B in FIG. 5.

The subscriber or user authentication process is performed by adding a message for accommodating an EAP framework to the PKM MAC message.

The subscriber station 10 transmits information for authentication of a subscriber to the base station 20 in step S61' through an EAP-Transfer Request message which is one of the PKM-REQ messages. The transmitted subscriber EAP-Transfer Request message will be described later.

The base station 20 receives the subscriber EAP-Transfer Request message from the subscriber station 10, authenticates the subscriber 10 through the AAA server 40, and transmits results to the subscriber station 10 through a subscriber EAP-Transfer Reply message which is one of the PKM-RSP messages in step S62'.

Hence, the authentication process of S60 for the subscriber station 10 is finished when the base station 20 transmits an EAP-Transfer Reply message to the subscriber station 10.

When it is determined that the authentication results included in the EAP-Transfer Reply message transmitted to the subscriber station 10 from the base station 20 show successful authentication, the subscriber station 10 transmits a Key Request message which is one of the PKM-REQ messages to the base station 20 which requests the traffic encryption key (TEK) of the subscriber station 10 in step S64, and the base station uses field values included in the Key Request message provided by the subscriber station 10, generates the TEK to be allocated to the corresponding subscriber station 10, and transmits the TEK and the TEK-related parameters to the subscriber station 10 through a Key Reply message which is one of the PKM messages in step S65

FIG. 6 shows a format of SBC-REQ message for the SS's basic capability negotiation process shown in FIG. 5

Referring to FIG. 6, the SBC-REQ message has a management message type value of 26, and has flexibility of parameters with a type/length/value (TLV) encoded information format.

The TLVs included in the SBC-REQ message include: a bandwidth allocation support for negotiation on the SS's duplex mode; an authorization policy support for selecting an authentication mode for authenticating the subscriber station 10, and a physical parameter support for negotiation on a demodulator, a modulator, and a Fast Fourier Transform (FFT) unit.

Figure 7:
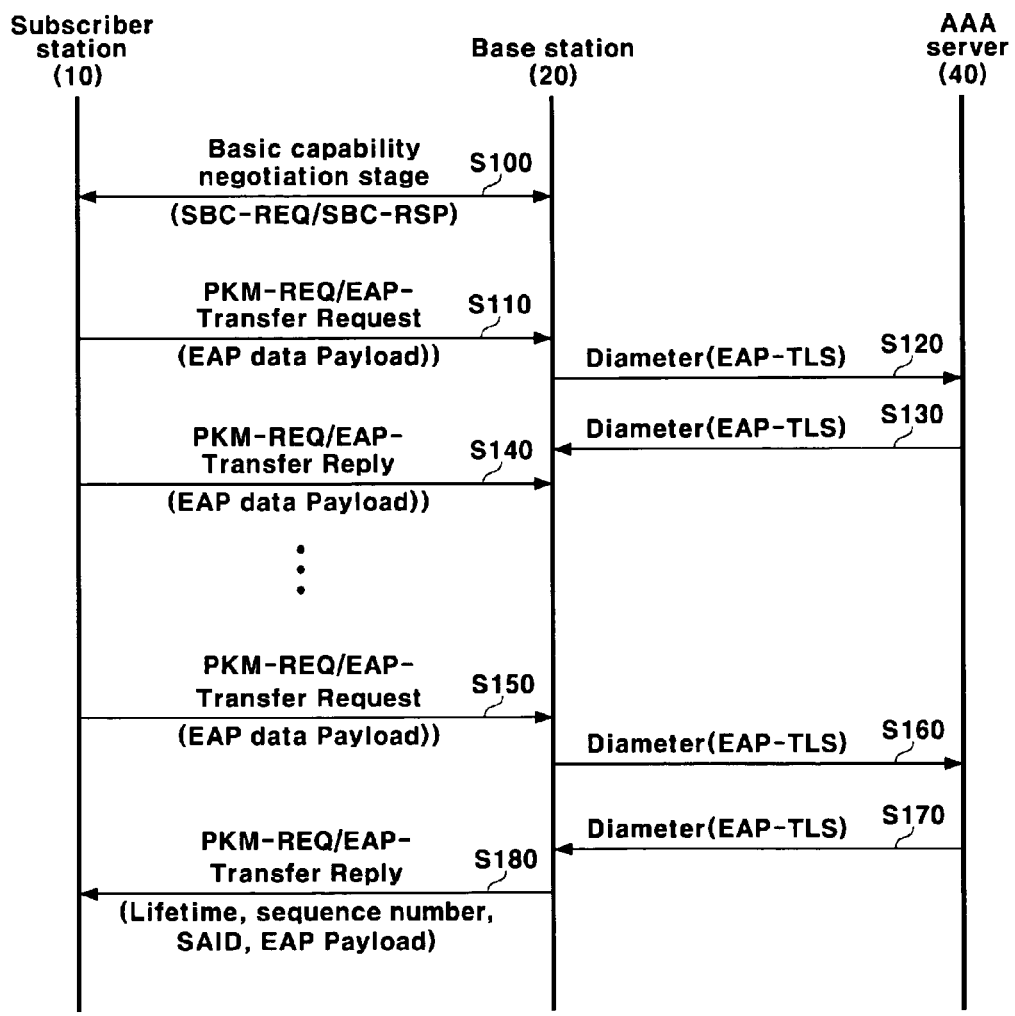
FIG. 7 shows an MAC flowchart for authenticating the subscriber or user based on the EAP in a subscriber station authentication method of the wireless portable Internet system according to the exemplary embodiment of the present invention.

FIG. 7 shows an MAC flowchart for authenticating the subscriber or user based on the EAP in a subscriber station authentication method of the wireless portable Internet system according to the exemplary embodiment of the present invention.

Referring to FIG. 7, the subscriber station 10 and the base station 20 transmit and receive a basic capability negotiation request/response message (SBC-REQ/SBC-RSP) therebetween to execute an authentication mode negotiation in step S100 according to the exemplary embodiment as described with reference to FIG. 5

An authentication mode negotiation between the subscriber station 10 and the base station 20 is performed through the above-noted process of S100. That is, one authentication mode between the subscriber station authentication policy based on the IEEE 802.16 legacy privacy and the subscriber or user authentication policy based on a standardized authentication protocol such as the EAP is synchronized between the subscriber station 10 and the base station 20. The case when the EAP based authentication mode is selected will now be described since the digital certificate based authentication mode of the IEEE 802.16 legacy privacy is well known.

The subscriber station 10 loads data including the TLS or the TTLS which is a security protocol of an application layer provided to the EAP, such as an EAP data payload, on a EAP-Transfer Request message newly added through a PKM-REQ message, and transmits the sane to the base station 20 in step S110, and the base station 20 extracts data in the EAP-Transfer Request message received from the subscriber station 10, and transmits the data to the AAA server 40 through a diameter protocol which is well known and standardized by the Internet engineer task force (IETF), in step S120.

The AAA server 40 processes the data transmitted by the base station 20 and transmits a result message to the base station 20 through the diameter protocol in step S130, and the base station 20 receives the result message from the AAA server 40 and transmits the same to the subscriber station 10 through an EAP-Transfer Reply message of the PKM message in step S140.

The above-described transmission of the EAP-Transfer Request and EAP-Transfer Reply messages between the subscriber station 10 and the base station 20 is repeated until the authentication for the subscriber station 10 is finished. The base station 20 receives the EAP-Transfer Request message from the subscriber station 10 in step of S150 in the final process of the authentication stage after the above-noted repetition, transmits the data to the AAA server 40 in step S160, and receives an authentication result from the AAA server 40 in step S170.

When receiving a message that the authentication result on the corresponding subscriber is found to be successful from the AAA server 40, the base station 20 generates an Authorization Key (AK) to be used by the corresponding subscriber to the EAP-Transfer Reply message, transmits the Authorization Key, one or more Security Association Identifier(s) (SAID) and additional properties of the Security Association (SA) to be authorized to requesting SS, and a lifetime to the subscriber station 10 in step S180, and terminates the authentication process.

However, when receiving a message that the authentication result on the corresponding subscriber is found to have failed, the base station 20 provides an authentication result to the EAP-Transfer Reply message, transmits the sane to the subscriber station 10, and terminates the authentication process.

FIG. 8 shows PKM message types in the MAC messages used for the subscriber station authentication method in the wireless portable Internet system according to the exemplary embodiment of the present invention.

Referring to FIG. 8, the subscriber station authentication method in the wireless portable Internet system defines the PKM message types of the MAC messages to be from the code of 0 to the code of 14. The PKM messages in the MAC messages of the IEEE 802.16 define ten types which are given from the code of 3 to the code of 12 in the PKM messages of the embodiment. That is, two more PKM messages for performing the authentication mode according to the authentication protocol of the upper layer on the EAP basis are added as the codes of 13 and 14 to the PKM messages of the IEEE 802.16. In this instance, the PKM message with the code of 13 is an EAP-Transfer Request message of PKM-REQ MAC messages, and the PKM message with the code of 14 is an EAP-Transfer Reply message of PKM-RSP.

Therefore, the subscriber station 10 can be authenticated by using the PKM messages with the codes of 4, 5, 6, and 12 when the authentication mode on the IEEE 802.16 legacy privacy basis is established, or the subscriber station 10 can be authenticated by using the PKM messages with the codes of 13 and 14 when the authentication mode on the EAP basis is established, in the authentication mode negotiation stage of S100 shown in FIG. 7. In this instance, the PKM message which is an EAP-Transfer Request message with the code of 13 is a PKM-REQ message transmitted to the base station 20 from the subscriber station 10, and the PKM message which is an EAP-Transfer Reply message with the code of 14 is a PKM-RSP message transmitted to the subscriber station 10 from the base station 20.

FIG. 9 shows components of messages for EAP-based subscriber authentication in the PKM messages shown in FIG. 8.

Referring to FIG. 9, the EAP-Transfer Request message with the code of 13 for the EAP based subscriber authentication includes parameters of security capabilities which are messages transmitted to the base station 20 from the subscriber station 10, an SAID, and an EAP payload.

The security capabilities parameter describes security capability of the subscriber station 10. The SAID parameter is an identifier for distinguishing selectable security association and is equal to the basic connection identifier (CID). The EAP payload parameter shows protocol data for authenticating the user, provided on the upper layer of the EAP.

The EAP-Transfer Reply message with the code of 14 for EAP base subscriber authentication includes messages of an EAP result code, an authorization action code, a key sequence number, a key lifetime, an SA descriptor, and an EAP payload transmitted to the subscriber station 10 from the base station 20.

The EAP result code shows a processed result of the EAP-Transfer request transmitted by the subscriber station 10. The authorization action code suggests an authentication process (e.g., initial authentication and re-authentication) which can be performed by the subscriber station 10 when the authentication result is found to have failed. The key sequence number and the key lifetime are parameters of a key distributed to the corresponding subscriber when the authentication is successful. The SA descriptor indicates descriptions on a security association set to be accommodated by both the subscriber station 10 and the base station 20. The EAP payload shows data for an upper security protocol.

The EAP-Transfer Reply message generated while performing the authentication process from among the parameter included in the EAP-Transfer Reply message includes no key sequence number and key lifetime which are key related parameters, but includes them when the authentication result is found to be successful in the final authentication process.

FIG. 10 shows attributes of authorization policy support parameters from parameters of the basic capability negotiation request message (SBC-REQ) shown in FIG. 6.

Referring to FIG. 10, the authorization policy support parameter used for an authentication mode negotiation on the subscriber station 10 has a type of 521 and has a one-byte length, and its value is defined by the bitmap rule.

In this parameter value, the bit of 0 represents establishment of the existing legacy privacy mode defined by the IEEE 802.16, and the bit of 1 shows establishment of an authentication mode according to the EAP based authentication protocol of the upper layer. Residual bits are reserved, but the residual bits of 2 to 7 can be used to represent the current EAP based upper authentication platform when the bit of 1 is established to set the EAP based authentication mode. In detail, the bit of 2 may represent establishment of the EAP-TLS authentication protocol, the bit of 3 may represent establishment of the EAP-TTLS authentication protocol, and other bits may be extendible according to addition of standardized security protocols of an application layer which can be supported later.

A subscriber station authenticator in the wireless portable Internet system according to an exemplary embodiment will be described.

Figure 11:
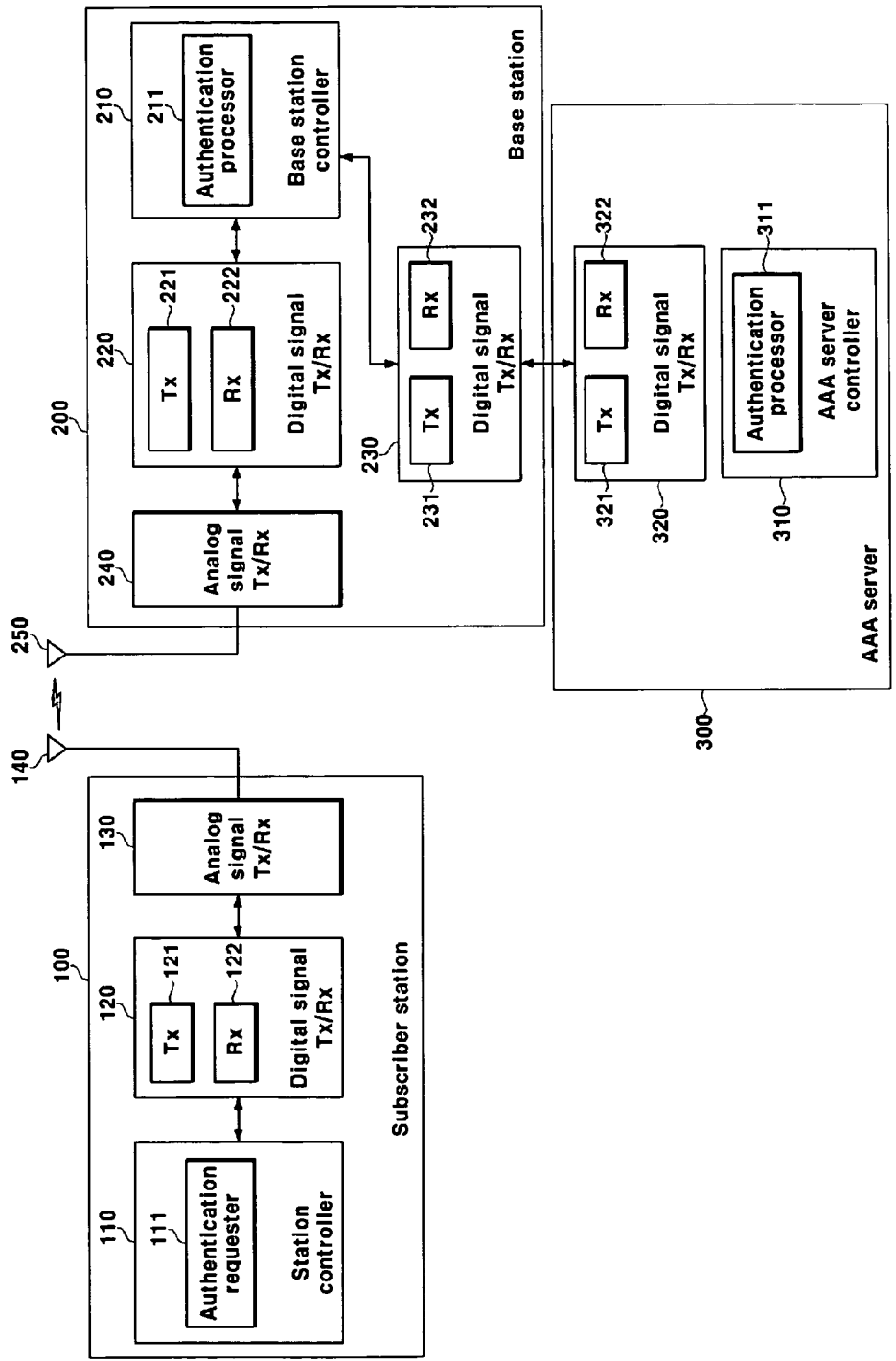
FIG. 11 shows a block diagram for subscriber station authentication in each node (including the SS, BS, and AAA server) in the wireless portable Internet system according to the exemplary embodiment of the present invention.

FIG. 11 shows a block diagram of a subscriber station authenticator in the wireless portable Internet system according to the exemplary embodiment of the present invention.

As shown, the subscriber station authenticator comprises a subscriber station 100, a base station, and an AAA server 300.

The subscriber station authenticator 100 includes a station controller 110, a digital signal transmitter and receiver 120, and an analog signal transmitter and receiver 130.

The station controller 110 includes an authentication requester 111, and the digital signal transmitter and receiver 120 includes a transmitter 121 and a receiver 122 for transmitting and receiving digital signals. The station controller 110 can further include a plurality of devices for transmitting and receiving data to/from the base station 200 and processing the data, which will not be described since they are well know to a person skilled in the art.

The authentication requester 111 requests authentication of the subscriber station 100 from the base station 200, and performs authentication with the base station 200 or the AAA server 300 according to the authentication mode established by the negotiation with the base station 200.

Figure 12:
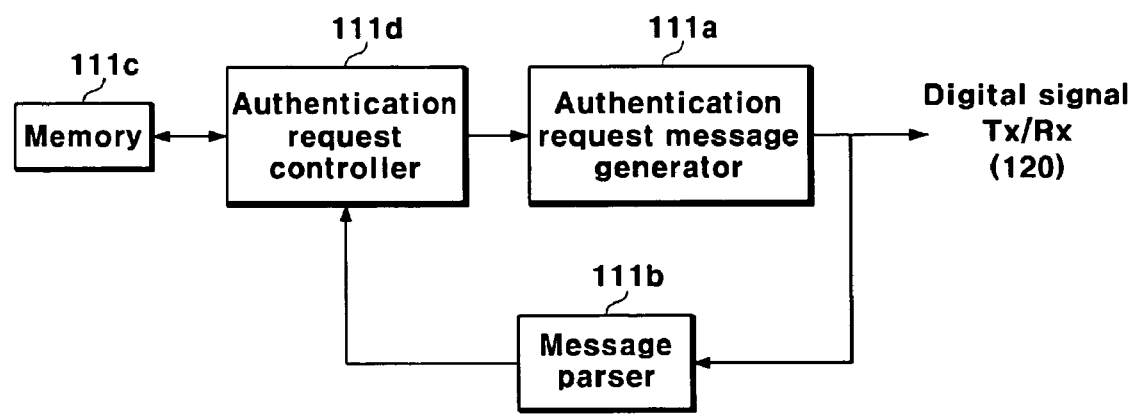
FIG. 12 shows a detailed block diagram of an authentication requester of a subscriber station shown in FIG. 11.

FIG. 12 shows a detailed block diagram of an authentication requester 111 of the subscriber station 100 shown in FIG. 11.

As shown, the authentication requester 111 includes an Authentication Request message generator 111a, an Authentication Reply message parser 111b, a memory 111c, and an Authentication Request controller 111d.

The Authentication Request message generator 111a generates an authentication mode negotiation message and a subscriber Authentication Request message for requesting authentication on the subscriber station 100, and transmits them to the digital signal transmitter and receiver 120. The authentication mode negotiation message is generated as an SBC-REQ message which is one of the MAC messages, and the SBC-REQ message of the IEEE 802.16 includes an authorization policy support parameter for authentication node negotiation as shown in FIGS. 6 and 10. Also, the subscriber Authentication Request message is generated as a PKM-REQ message which is one of the MAC messages, and it allows authentication by the EAP based authentication protocol of the upper layer to be performed on the PKM-REQ message of the IEEE 802.16 by the AAA server 300 as shown in FIGS. 8 and 9.

The Authentication Reply message parser 111b receives through the digital signal transmitter and receiver 120 the authentication mode negotiation message and the subscriber Authentication Reply message which are transmitted by the base station 200 by using the SBC-RSP message which is one of the MA messages, parses the messages, and transmits parsed results to the Authentication Request controller 111d. The results parsed by the Authentication Reply message parser 111b include authentication mode established states and authenticated results.

The memory 111c stores results parsed by the Authentication Reply message parser 111b, including authentication modes which are negotiated and established and errors which are found when the authentication is failed.

The Authentication Request controller 111d requests authentication on the subscriber station 100 from the base station 200, and controls operations of the Authentication Request message generator 111a, the Authentication Reply message parser 111b, and the memory 111c so as to receive a reply from the base station 200 and process the sane.

The digital transmitter and receiver 120 includes a transmitter 121 for transmitting signals provided by the station controller 110 to the base station 200 through the analog signal transmitter and receiver 130, and a receiver 122 for receiving the signals through the analog signal transmitter and receiver 130 and transmitting them to the station controller 110. In particular, the transmitter 121 modulates and encodes the Authentication Request messages SBC-REQ and PKM-REQ transmitted by the station controller 110, and the analog signal transmitter and receiver 130 wirelessly transmits the modulated and encoded messages to the base station 200 through the antenna 140.

Also, the analog signal transmitter and receiver 130 and the receiver 122 of the digital transmitter and receiver 120 receive the Authentication Reply messages SBC-RSP and PKM-RSP from the base station 200 through the antenna 140 and transmit them to the station controller 110.

The base station 200 includes a base station controller 210, digital signal transmitters and receivers 220 and 230, and an analog signal transmitter and receiver 240.

The base station controller 210 establishes an authentication mode according to a subscriber Authentication Request provided by the subscriber station 100, and performs authentication according to the negotiated authentication mode. In this instance, the base station 200 performs the authentication when the authentication mode is an authentication mode on the basis of the IEEE 802.16 privacy standard, but the base station 200 performs the authentication through the AAA server 300 when the authentication mode is an authentication mode on the basis of the EAP based authentication protocol of the upper layer. For this purpose, the base station controller 210 includes an authentication processor 211.

Figure 13:
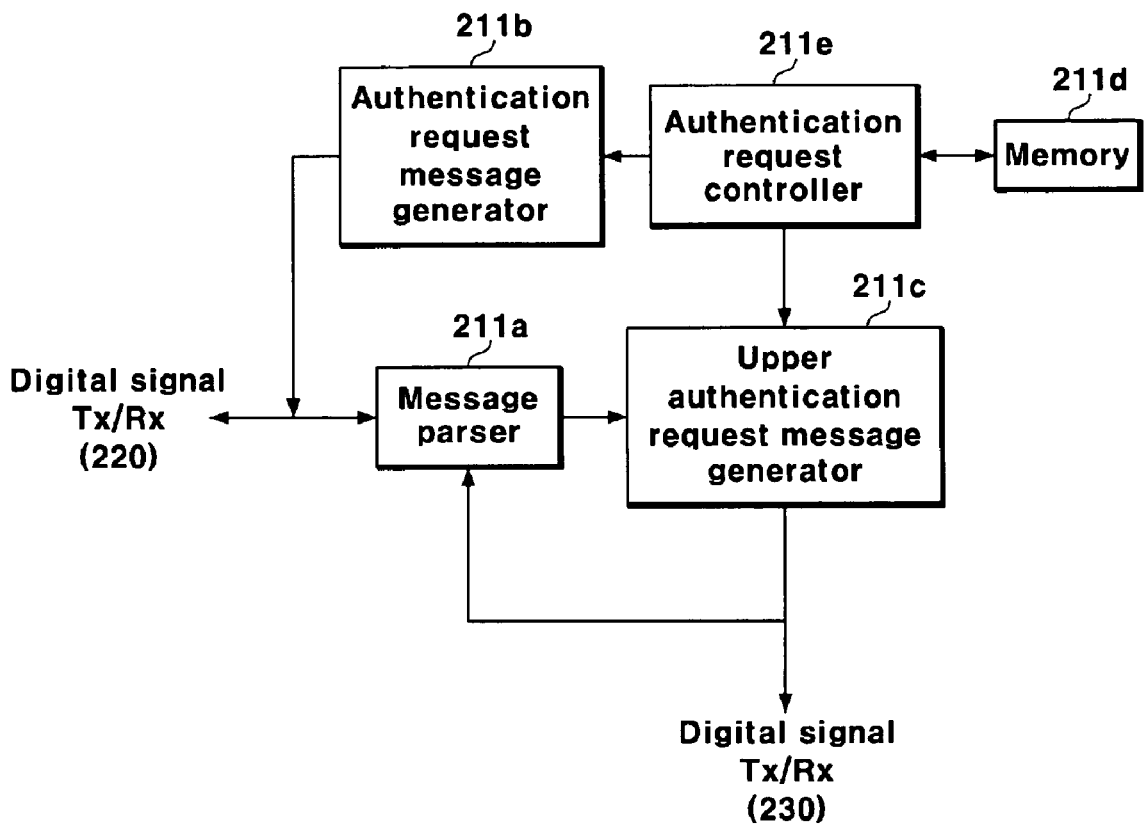
FIG. 13 shows a detailed block diagram of an authentication processor of a base station shown in FIG. 11.

FIG. 13 shows a detailed block diagram of an authentication processor of a base station shown in FIG. 11.

As shown, the authentication processor 211 comprises a message parser 211a, an Authentication Reply message generator 211b, an upper Authentication Request message generator 211c, a memory 211d, and an authentication controller 211e.

The message parser 211a parses the authentication mode negotiation message SBC-REQ and the subscriber Authentication Request message PKM-REQ from among the MAC messages provided by the subscriber station 100 through the digital signal transmitter and receiver 220, parses the diameter message which is an authentication protocol message of the upper layer provided by the AAA server 300 through the digital signal transmitter and receiver 230, and transmits parsed results to the authentication controller 211e.

The Authentication Reply message generator 211b generates a reply message for the authentication mode negotiation message or the subscriber Authentication Request message provided by the subscriber station 100, and transmits the reply message to the subscriber station 100 through the digital signal transmitter and receiver 120.

The upper Authentication Request message generator 211c generates a diameter protocol message for requesting authentication on the subscriber station 100 from the AAA server 300, and transmits the diameter protocol message to the AAA server 300 through the digital signal transmitter and receiver 230 when the EAP based authentication mode of the upper layer is negotiated during the authentication mode negotiation process with the subscriber station 100.

The memory 211d stores results parsed by the message parser 211a, including authentication modes which are negotiated and established or errors which are generated when the authentication is failed.

The authentication controller 211e performs a process caused by an Authentication Request provided by the subscriber station 100 and generates a reply, and when the EAP based authentication mode of the upper layer is established, the authentication controller 211e requests authentication on the subscriber station 100 from the AAA server 300, and controls the operations of the message parser 211a, the Authentication Reply message generator 211b, the upper Authentication Request message generator 211c, and the memory 211d so as to receive a reply from the AAA server 300 and process the same.

The digital transmitter and receiver 220 includes a transmitter 221 for transmitting signals provided by the base station controller 210 to the subscriber station 100 through the analog signal transmitter and receiver 230, and a receiver 222 for receiving the signals through the analog signal transmitter and receiver 240 and transmitting them to the base station controller 210. In particular, the transmitter 221 modulates and encodes the Authentication Reply messages SBC-RSP and PKM-RSP transmitted by the base station controller 210, and the analog signal transmitter and receiver 240 wirelessly transmits the modulated and encoded messages to the subscriber station 200 through the antenna 250.

Also, the analog signal transmitter and receiver 240 and the receiver 222 of the digital transmitter and receiver 220 receive the Authentication Request messages SBC-REQ and PKM-REQ from the subscriber station 100 through the antenna 250 and transmit them to the base station controller 210.

The digital transmitter and receiver 230 comprises a transmitter 231 for transmitting the signals provided by the base station controller 210 to the AAA server 300, and a receiver 232 for transmitting the signals provided by the AAA server to the base station controller 210. In this instance, the transmitter 231 and the receiver 232 transmit the EAP based authentication protocol message (e.g., a diameter message) between the base station controller 210 and the AAA server 300.

The AAA server 300 includes an AAA server controller 310 and a digital signal transmitter and receiver 320.

The AAA server controller 310 authenticates subscribers according to the EAP based subscriber Authentication Request of the upper layer provided by the base station, and it includes an authentication processor 311.

Figure 14:
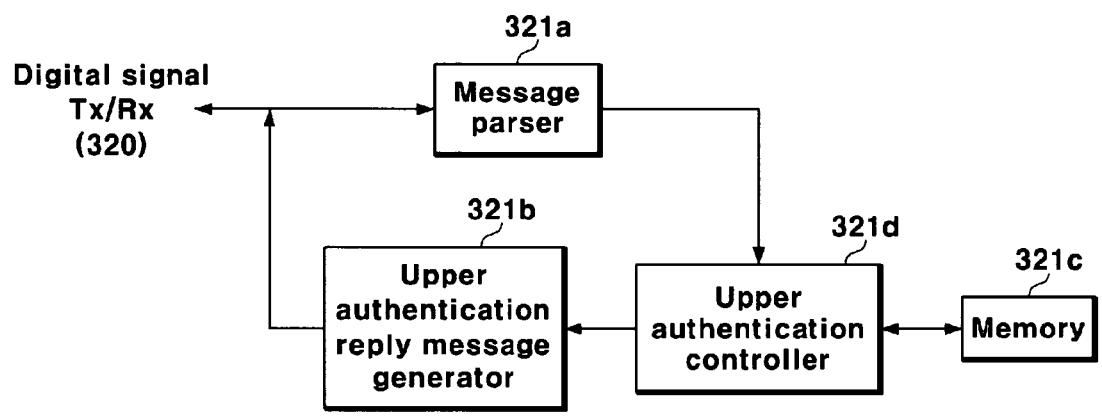
FIG. 14 shows a detailed block diagram of an authentication processor of an AAA server shown in FIG. 11.

FIG. 14 shows a detailed block diagram of an authentication processor of an AAA server shown 300 in FIG. 11.

As shown, the authentication processor 311 includes an upper Authentication Request message parser 311a, an upper Authentication Reply message generator 311b, a memory 311c, and an authenticator controller 311d.

The upper Authentication Request message parser 311a parses the authentication protocol message of the upper layer provided by the base station 200 through the digital signal transmitter and receiver 320, including a diameter message, and transmits parsed results to the authentication controller 311d.

The upper Authentication Reply message generator 311b generates a reply message for the upper Authentication Request message provided by the base station 200, and transmits the reply message to the base station 200 through the digital signal transmitter and receiver 320.

The memory 311c stores results parsed by the message parser 311a, including errors which are generated when the authentication is failed.

The authentication controller 311d controls the operations of the upper Authentication Request message parser 311a, the upper Authentication Reply message generator 311b, and the memory 311c in order to perform a process according to an Authentication Request of the upper layer provided by the base station 200 and generate a reply.

The digital transmitter and receiver 320 comprises a transmitter 310 for transmitting the signals provided by the AAA server controller 310 to the base station 200, and a receiver 322 for transmitting the signals provided by the base station 200 to the AAA server controller 310. The transmitter 321 and the receiver 322 transmit the EAP based authentication protocol message (e.g., a diameter message) between the AAA server controller 310 and the base station 200.

While this invention has been described in connection with what is presently considered to be the most practical and exemplary embodiment, it is to be understood that the invention is not limited to the disclosed embodiments, but, on the contrary, is intended to cover various modifications and equivalent arrangements included within the spirit and scope of the appended claims.

According to the present invention, the support for mobile subscriber stations is available to the authentication function of subscriber stations supported by the IEEE 802.16.

Also, interworking with different networks is allowed for the networks between different service providers or the case of different networks with the same service provider.

Further, the present invention has good extendibility since it supports security protocols of upper layers, and the same is very advantageous since it uses verified standard security protocols.

The invention claimed is:

1. A method of requesting an authentication to a base station in a subscriber station, the method comprising:
    transmitting a subscriber station basic capability negotiation request (SBC-REQ) message to the base station, the SBC-REQ message including information on at least one authentication mode that can be supported by the subscriber station;
    receiving a subscriber station basic capability negotiation response (SBC-RSP) message including information on an authentication mode that is selected by the base station among the at least one authentication mode; and
    transmitting an authentication request message corresponding to the selected authentication mode to the base station.

2. The method of claim 1, wherein each of the SBC-REQ message and the SBC-RSP message includes a parameter for selecting the authentication mode.

3. The method of claim 1, wherein the selected authentication mode includes at least one of a digital certificate based authentication mode and an extensible authentication protocol (EAP) based authentication mode.

4. The method of claim 1, wherein, when the selected authentication mode is a digital certificate based authentication mode, the authentication request message is a message for requesting the authentication by the base station.

5. The method of claim 1, wherein, when the selected authentication mode is a digital certificate based authentication mode, the authentication request message includes an authentication information message and an authorization request message.

6. The method of claim 1, wherein, when the selected authentication mode is an EAP-based authentication mode, the authentication request message is a message for requesting the authentication by an authentication, authorization, and accounting (AAA) server,
    wherein the AAA server is connected to the base station and performs the authentication.

7. The method of claim 1, wherein, when the selected authentication mode is an EAP-based authentication mode, the authentication request message includes an EAP payload,
    wherein the EAP payload includes data for the authentication.

8. The method of claim 1, wherein the authentication request message is a privacy key management request (PKM-REQ) message included in a medium access control (MAC) message.

9. A method of performing an authentication on a subscriber station in a base station, the method comprising:
receiving a subscriber station basic capability negotiation request (SBC-REQ) message from the subscriber station, the SBC-REQ message including information on at least one authentication mode that can be supported by the subscriber station;
selecting an authentication mode from among the at least one authentication mode;
transmitting a first response message to the subscriber station, the first response message including information on the selected authentication mode;
receiving an authentication request message corresponding to the selected authentication mode from the subscriber station; and
transmitting a second response message to the subscriber station, the second response message representing a result of the authentication performed in accordance with the authentication request message.

10. The method of claim 9, wherein the authentication mode includes at least one of a digital certificate based authentication mode and an extensible authentication protocol (EAP) based authentication mode.

11. The method of claim 9, wherein, when the selected authentication mode is an EAP-based authentication mode, the receiving of the authentication request message comprises requesting an authentication, authorization, and accounting (AAA) server to perform an authentication through an standardized authentication protocol of an upper layer.

12. The method of claim 9, wherein, when the selected authentication mode is an EAP-based authentication mode, the second response message includes an EAP payload,
wherein the EAP payload includes data for the authentication.

13. The method of claim 9, wherein, when the selected authentication mode is a digital certificate based authentication mode, the second response message includes an authentication reply message.

14. The method of claim 9, wherein the second response message is a privacy key management response (PKM-RSP) message included in a medium access control (MAC) message.

15. An apparatus for performing an authentication on a subscriber station in a base station, the apparatus comprising:
a message parser configured to receive a first message from the subscriber station, the first message including information on at least one authentication mode that can be supported by the subscriber station;
an authentication controller configured to select an authentication mode that can be performed by the base station among the at least one authentication mode
an authentication reply message generator configured to transmit a second message including information on the selected authentication mode to the subscriber station
wherein the message parser is further configured to receive an authentication request from the subscriber station by receiving a privacy key management request (PKM-REQ) message having a message type according to the selected authentication mode, and
wherein the authentication reply message generator is further configured to transmit a privacy key management response (PKM-RSP) message having a message type according to the selected authentication mode to the subscriber station in response to the authentication request.

16. The apparatus of claim 15, wherein, when the selected authentication mode is an extensible authentication protocol (EAP) based authentication mode, the message type of each of the PKM-REQ message and the PKM-RSP message is an EAP transfer including an EAP payload,
wherein the EAP payload includes data for the authentication.

17. A method of negotiating an authentication mode with a subscriber station in a base station, the method comprising:
receiving a subscriber station basic capability negotiation request (SBC-REQ) message from the subscriber station, the SBC-REQ message including a parameter representing at least one authentication mode that can be supported by the subscriber station;
selecting an authentication, mode that can be performed by the base station among the at least one authentication mode; and
transmitting a subscriber station basic capability negotiation response (SBC-RSP) message to the subscriber station, the SBC-RSP including a parameter representing the selected authentication mode.

18. The method of claim 17, further comprising:
receiving a privacy key management request (PKM-REQ) message having a message type according to the selected authentication mode; and
transmitting a privacy key management response (PKM-RSP) message having a message type according to the selected authentication mode to the subscriber station in response to the PKM-REQ message.

19. The method of claim 18, wherein, when the selected authentication mode is an extensible authentication protocol (EAP) based authentication mode, the message type of each of the PKM-REQ message and the PKM-RSP message is an EAP transfer including an EAP payload, and
the EAP payload includes data for an authentication.

20. A method of performing an authentication on a subscriber station in a base station, the method comprising:
setting an extensible authentication protocol (EAP) based authentication mode as an authentication mode by negotiating with the subscriber station, wherein the EAP based authentication mode is selected by the base station from among at least one authentication mode that can be supported by the subscriber station;
receiving an authentication request by receiving a privacy key management request (PKM-REQ) message from the subscriber station, the PKM-REQ message having a message type according to the EAP-based authentication mode; and
transmitting a privacy key management response (PKM-RSP) message to the subscriber station in response to the authentication request, the PKM-RSP message having a message type according to the EAP based authentication mode.

21. The method of claim 20, wherein the message type of each of the PKM-REQ message and the PKM-RSP message is an EAP transfer including an EAP payload, and
the EAP payload includes data for the authentication.

22. An apparatus for requesting an authentication to a base station in a subscriber station, the apparatus comprising:
an authentication request message generator configured to transmit a first message to the base station, the first message including information on at least one authentication mode that can be supported by the subscriber station; and
an authentication reply message parser configured to receive a second message from the base station, the second message including information on an authentication mode selected by the base station among the at least one authentication mode, wherein the authentication request message generator is further configured to request an authentication by transmitting a privacy key management request (PKM-REQ) message to the base station, the PKM-REQ message having a message type according to the selected authentication mode, and wherein the authentication reply message parser is further configured to receive a privacy key management response (PKM-RSP) message having a message type according to the selected authentication mode from the base station in response to the authentication request.

23. The apparatus of claim 22, wherein, when the selected authentication mode is an extensible authentication protocol (EAP) based authentication mode, the message type of each of the PKM-REQ message and the PKM-RSP message is an EAP transfer including an EAP payload, and wherein the EAP payload includes data for the authentication.

* * * * *